United States Patent Office 3,298,171
Patented Jan. 17, 1967

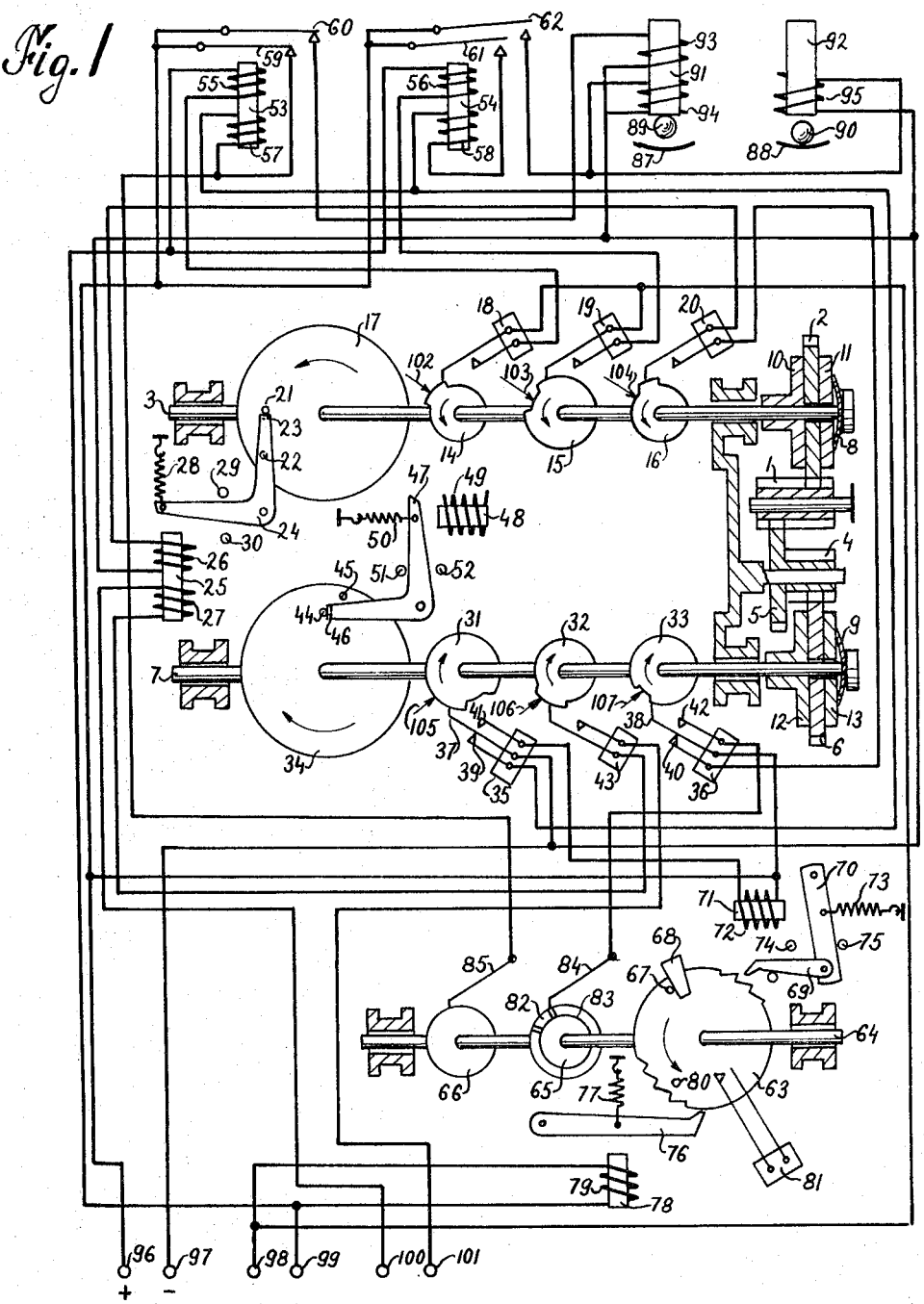

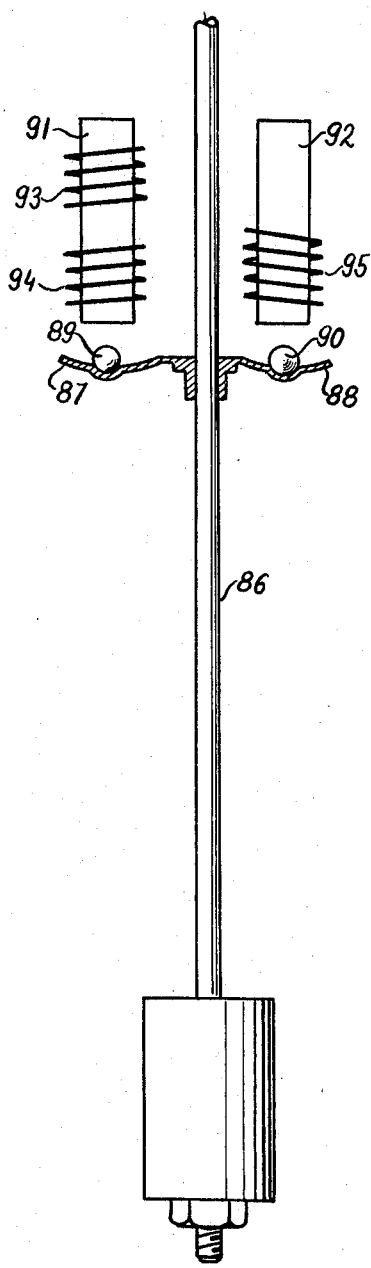

3,298,171
APPARATUS FOR REMOTE CONTROL OF PENDULUM MOVEMENT MASTER CLOCKS
Vaclav Pfeffer, Prague, Frantisek Holecek, Kojovice, and Karel Gemperle, Dobrichovice, Czechoslovakia, assignors to Laboratorni Pristroje, narodni podnik, Prague, Czechoslovakia
Filed July 8, 1965, Ser. No. 470,415
Claims priority, application Czechoslovakia,
July 11, 1964, 4,023/64
5 Claims. (Cl. 58—35)

This invention relates to clock systems in which a master clock controls a plurality of secondary clocks, and particularly to the remote control of the period of oscillation of a pendulum in a master clock by means of radio signals.

It was customary for a long time to control a plurality of secondary clocks by a pendulum-operated master clock. More recently, small master clocks remotely controlled by radio signals have become available, and have made the heavy, bulky, and less accurate pendulum clocks obsolete. Yet, many such pendulum-operated clocks are still in good working condition and represent a heavy investment.

It is the object of this invention to provide an attachment for existing pendulum-operated master clocks which permits the clocks to be controlled remotely by means of radio signals.

With this object and others in view, the invention provides a master clock including a pendulum with an electrically operated regulating device which includes increments of mass, and varies the effective length of the pendulum by adding the mass increments to a portion of the pendulum remote from its center of gravity, and by withdrawing the increments. Supply of electric operating power to the regulating device is controlled by an apparatus connected to two signal sources in such a manner that a mass increment is added to the pendulum in response to a first sequence of signals from the two signal sources, a mass increment is withdrawn from the pendulum in response to a second signal sequence, and the regulating device remains inactive in response to a third signal sequence. In one of these sequences, the signal from one source precedes the signal from the other source, and the latter precedes the signal from the first source in another sequence. The signals are substantially simultaneous in the remaining sequence.

The control apparatus includes sets of main switches and of auxiliary switches actuated by respective main and auxiliary actuating means. A first coupling arrangement is provided for drivingly coupling the auxiliary actuating means to a synchronous motor. A second coupling arrangement drivingly couples the motor to the main actuating means in response to a signal from one of the aforementioned signal sources and to the actuation of the auxiliary switches by the auxiliary actuating means. The main switches are conductively interposed between the other signal source and the regulating device for operating the same in response to a signal from the other signal source and to the actuation of the main switches by the main actuating means.

When the signal from one signal source is not followed by a signal from the other signal source within a set time, the control device sets the effective length of the pendulum at a fixed predetermined value.

The exact nature of this invention as well as other objects and features thereof will be readily apparent from consideration of the following specification relating to the annexed drawing in which:

FIG. 1 shows a control attachment of the invention partly in elevational section, and partly in diagram; and FIG. 2 illustrates the cooperation of the device of FIG. 1 with the pendulum of the master clock in an elevational fragmentary view.

As is seen in FIG. 1, the drive pinion 1 of a synchronous electric motor, not otherwise shown, meshes with a toothed wheel 2 rotatably mounted on a main shaft 3 and with an intermediate wheel 5 whose pinion 4 meshingly engages another toothed wheel 6 rotatably mounted on an auxiliary shaft 7. The wheels 2, 6 are connected to the respective shafts 3, 7 by friction couplings. The friction coupling on the shaft 3 is constituted by a fixed flange 10 and by an axially slidable disc 11 which receive the wheel 2 therebetween. A spring 8 urges the disc 11 axially toward the wheel 2 and the flange 10. The analogous friction coupling between the shaft 7 and the wheel 6 consists of a flange 12 fixed on the shaft 7, an axially slidable disc 13, and a spring 9. The tooth ratio of the meshingly engaged elements described so far and the speed of the synchronous motor are selected in such a manner that the main shaft 3 makes one revolution in 150 milliseconds and the auxiliary shaft 7 revolves once in 90 seconds when driven by the pinion 1.

Three radial switch-actuating cams 14, 15, 16 and a disc 17 are fixedly mounted on the main shaft 3. The cams operate respective single-pole, single-throw main switches 18, 19, 20. The disc 17 carries two axial pins 21, 22 radially and circumferentially offset from each other, the pin 21 being nearer the axis of rotation and moving behind the pin 22 when the disc rotates in the direction indicated by an arrow. The pins 21, 22 cooperate with an abutment on one arm 23 of a bellcrank lever 24 whose other arm may be attracted by an electromagnet 25 having two windings 26, 27. A return spring 28 biases the lever 24 toward abutting engagement with a stop 29 whereas the lever abuts against a stop 30 when the magnet 25 is energized.

In the illustrated position, the lever 24 is held by the spring 28 against the stop 29, and the arm 23 is in the path of the pin 21, thereby stopping rotation of the main shaft 3 by the pinion 1 in a position in which the switches 18, 19, 20 are open.

Switch actuating cams 31, 32, 33 and a disc 34 are fixedly mounted on the auxiliary shaft 7. The cams 31, 33 operate single-pole, double-throw auxiliary switches 35, 36, having respective movable contacts 37, 38 and pairs of fixed contacts 39–41 and 40–42. The cam 32 controls a single-pole, single-throw auxiliary switch 43. Axial pins 44, 45 are arranged on the disc 34 in the manner of the afore-mentioned pins 21, 22 for abutting cooperation with one arm 46 of a bellcrank lever 47 pivoted by an electromagnet 48 and a return spring 50 between positions of engagement with stops 51, 52 respectively when the winding 49 of the magnet 48 is energized and deenergized. When the winding 49 is deenergized, the arm 46 of the lever 45 is in the path of the pin 44 on the disc 34, and stops the shaft 7 in the illustrated position in which the movable contacts 37, 38 of the switches 34, 36 engage the fixed contacts 39, 40 respectively, and the switch 43 is open.

The illustrated apparatus further includes two identical relays 53, 54 having respective main windings 55, 56 and auxiliary windings 57, 58, and normally open contacts 59, 60 and 61, 62.

A wheel 63, a commutator 65, and a collector 66 are fixedly mounted on a common shaft 64. A non-illustrated spring biases the shaft 64 toward the illustrated position in which an axial pin 67 on the wheel 63 abuts against a stationary stop 68. Ratchet teeth provided on two circumferential segments of the wheel 63 cooperate with pawls 69, 76. The pawl 69 is attached to the free end of a pivotally mounted armature 70 of an electromagnet 71 equipped with a winding 72. When the winding is deenergized, the armature 70 is held by a return spring 73 against a stop 75, as shown in the drawing, and abuts against a stop 74 when it is attracted by the magnet 71. The pawl 69 turns the wheel 63 by one spacing of its ratchet teeth during each operating cycle of the magnet 71.

The pawl 76 holds the wheel 63 in its advanced position against the non-illustrated biasing spring of the shaft 64 under the tension of a spring 77, and may be disengaged from the wheel 63 by an electromagnet 78 having a winding 79. A pin 80 on the wheel 63 closes a switch 81 during rotation of the wheel by the pawl 69.

The commutator 65 has an insulated 45° segment and a conducting segment 83 extending substantially over the remainder of the commutator circumference and conductively connected to the shaft 64 and the collector 66. Brushes 84, 85 respectively engage the commutator 65 and the collector 66.

The apparatus described so far controls the effective length of a pendulum 86 of a master clock, not otherwise shown, in a manner best understood by joint consideration of FIGS. 1 and 2.

Two plates 87, 88 of non-magnetic material having the shape of shallow cups are mounted on the pendulum above its center of gravity and may receive balls 89, 90 of soft magnetic material without significant remanence. Two electromagnets 91, 92 are mounted on the non-illustrated stationary frame of the apparatus above the plates 87, 88 respectively so that the balls 89, 90 are within the field of attraction of the associated magnets. The magnet 91 has two windings 93, 94, and the magnet 92 has a single winding 95.

The effective length of the pendulum is adjusted in such manner, that its time of oscillation is approximately correct when one of the balls 89, 90 is received in the associated plates 87, 88. It swings more rapidly with both balls on the plates, and more slowly when both balls are lifted by the magnets 91, 92. FIG. 1 shows the normal condition of the pendulum system with the ball 90 on the plate 88, and the ball 89 suspended by the magnet 91.

The apparatus shown in FIG. 1 receives electric operating power in the form of direct current through terminals 96, 97. The terminals 98, 99 are normally connected to the output of a receiver for a time signal transmitted by radio, and the terminals 100, 101 are input terminals for receiving timing pulses from the master clock once every minute. The non-illustrated radio receiver connected to the terminals 98, 99 receives timing signals at a frequency of 1000 cycles and is not in itself a part of this invention.

The manner in which the several elements of the aforedescribed apparatus are conductively connected will be apparent from the following description of their operation.

The non-illustrated timing switch of the master clock closes a circuit about one minute prior to the anticipated reception of the radio time signal, say at 11:59, thereby energizing the synchronous motor represented by the pinion 1 and the winding 49 of the electromagnet 48. The pinion turns the wheels 2, 6, and the magnet 48 swings the lever 47 away from the illustrated position and thereby permits the auxiliary shaft 7 to be turned while the main shaft 3 is still arrested. The cams 31, 32, 33 are turned in the direction of the arrows in FIG. 1.

Six seconds after the start of rotation of the cam 32, the switch 43 is closed, and the winding 27 of the magnet 25 may be energized with current from the terminals 100, 101 when they receive current pulses or signals of two seconds duration once a minute from the master clock during regulating periods which may be repeated every six hours. The control apparatus having been started one minute before the hour, the magnet 25 can be energized only by the signal of the master clock corresponding to the sixtieth minute.

The cam 31 shifts the movable contact 37 of the switch 35 from the fixed contact 39 to the fixed contact 41 six seconds after rotation of the shaft 7 is started, and maintains this position of the movable contact for six seconds. The windings 57, 58 of the relays 53, 54 are thereby disconnected from the negative terminal 97 of the D.C. supply. This does not affect the relay 54 which was not energized, and whose contacts 61, 62 are open at this stage.

The previously energized relay 53, however, releases its armature and opens the contacts 59, 60, thereby disconnecting its winding 57 and the winding 93 of the electromagnet 91 from the positive D.C. terminal 96. The ball 89 is dropped on the plate 87. If the electromagnet 92 had been energized before, it would now also be deenergized, and the associated ball 90 would also now be dropped on the plate 88. Both balls are thus deposited on the plates 87, 88 fifty-four seconds before the anticipated reception of the radio time signal.

Closing of a circuit through the contact 41 causes energizing current to flow through the winding 72 of the electromagnet 71, and the armature 70 is attracted, causing the pawl 69 to move the wheel 63 by one tooth spacing. The commutator 65 turns with the wheel, and the brush 84 is connected by the segment 83 with the collector 66 and the brush 85.

During the next six seconds, the movable contact 37 of the switch 35 is returned from the contact 41 to the contact 39, and the magnet 71 releases its armature 70, whereby the pawl 69 is disengaged from the wheel 63 by the spring 73. The wheel 63 is arrested by the pawl 76. The circuit reestablished through the contact 39 connects the auxiliary windings 57, 58 of the relays 53, 54 with the terminal 97, but the relays are not energized as long as the contacts 59, 61 are open.

The operations described so far require twelve seconds and partly prepare the apparatus of FIG. 1 for response to a regulating radio signal.

An electrical pulse received from the master clock through the terminals 100, 101 on the sixtieth minute of the regulating period passes through the closed switch 43 and the winding 27 to energize the electromagnet 25 which attracts the arm 23 of the lever 24, and releases the disc 17. The main shaft 3 is turned by the pinion 1 through somewhat less than one full revolution until the pin 22 on the disc 17 abuts against the arm 23 of the lever 24, the lever being held against the stop 30 during the two seconds duration of the signal from the master clock.

When the shaft 3 is stopped, the portions of the cams 14, 15, 16 indicated by arrows 102, 103, 104 engage the switches 18, 19, 20. During the angular movement of the cams from the illustrated position to that indicated by the arrows, the following events take place:

Ten milliseconds after rotation of the shaft 3 starts, the switch 20 is closed, and the winding 26 of the magnet 25 is energized by direct current from the terminals 96, 97 through the contact 40 of the switch 36. The magnet 25 thus remains energized even after the signal of the master clock is terminated.

Two milliseconds after rotation of the shaft 3 starts, the switch 18 is closed by the cam 14 and connects the main winding 55 of the relay 53 with the terminals 98, 99 for 120 milliseconds.

120 milliseconds after rotation of the shaft 3 starts, the switch 19 is closed by the cam 15, and connects the main winding 56 of the relay 54 with the input terminals 98, 99 at exactly the same moment at which the switch 18 is again opened.

The apparatus is now ready for remote control by a radio signal from a receiver which is passed through an analyzer and fed to the terminals 98, 99.

Let it be assumed that the master clock is late, and that the signal corresponding to the sixtieth minute is delivered late so that the radio signal is received earlier.

The radio signal thus arrives while the magnet 25 is not yet energized, and the shaft 3 with the cams 14, 15, 16, and the disc 17 is still in the illustrated position, the switches 18, 19, 20 are open, and the main windings 55, 56 of the relays 53, 54 are disconnected from the terminals 98, 99.

The last element of the time signal which lasts one hundred milliseconds passes through the winding 79, whereby the electromagnet 78 retracts the pawl 76 from the wheel 63, and permits the wheel to be returned to the illustrated position by the non-illustrated biasing spring of the shaft 64.

The relays 53, 54 are not energized because their circuits are interrupted at the switches 18, 19, and the electromagnets 91, 92 which are controlled by the relays also are not energized. The balls 89, 90 remain on the plates 87, 88, and the pendulum of the master clock thereafter swings faster than normal.

If the master clock is running on time, the start of its sixtieth minute pulse coincides with the radio signal, and the shaft 3 starts turning, whereby the cam 14 closes the switch 18, and the last element of the radio signal is passed through the winding 55 of the relay 53 which closes its contacts 59, 60, thereby connecting the auxiliary winding 57 with the direct source 96, 97 through the contact 39 of the switch 35 in a holding circuit. The relay 53 remains energized and feeds current from the terminals 96, 97 to the winding 93, whereby the magnet 91 lifts the ball 89. The pendulum continues swinging with but one ball 90. The radio signal also resets the wheel 63 to the illustrated position by retracting the pawl 76.

If the master clock is fast, it transmits its sixtieth minute pulse before reception of the radio time signal. The electromagnet 25 is energized and releases the main shaft 3. The circuit formed by the briefly closed switch 18 remains unused, and the apparatus is prepared for reception of the radio signal by the closing of the switch 19. The signal is passed through the main winding 56 of the relay 54 which thereby closes its contacts 61, 62, and energizes its holding circuit through the auxiliary winding 58, the contact 38 of the switch 35, and the terminals 96, 97.

The contact 62 of the relay 54 connects the windings 94, 95 of the electromagnets 91, 92 with the terminals 96, 97, and both balls 87, 88 are lifted from the plates 87, 88 of the pendulum. The pendulum thereafter swings at a lower speed. The wheel 63 is returned to its original position by the radio signal in the manner described above. The mass of the balls 89, 90 is selected for approximate compensation of the deviation during the interval between two radio timing signals.

While the cams 14, 15, 16 turn with the shaft 3, as described above, the cams 31, 32, 33 continue turning with the shaft 7. Their operation preparatory to reception of a radio control signal has been described above. Their operating cycle is completed as follows:

Forty-eight seconds after the shaft 7 starts rotating, that is, twenty-four seconds after transmission of the sixtieth-minute signal by the master clock, the switch 43 is opened by the cam 32 and disconnects the winding 27 of the magnet 25 from the terminals 100, 101. Later signals from the master clock are ineffective, and it is seen that the magnet 25 can be energized by the sixtieth-minute signal of the master clock only. It remains energized, however, as long as its winding 26 is supplied with direct current from the terminals 96, 97 through the contact 40 of the switch 36 and through the switch 20.

Also, forty-eight seconds after movement of the shaft 7 starts, and 24 seconds after the sixtieth-minute signal has been transmitted by the master clock, the cam 33 switches the movable contact 38 of the switch 36 from the fixed contact 40 to the fixed contact 42, thereby disconnecting the winding 26 of the magnet 25 from the direct current terminal 96, and permitting the lever 24 to be moved into engagement with the stop 29 by the return spring 28. The abutment on the lever arm 23 is swung out of the path of the pin 22 into that of the pin 21.

The disc 17 thus is rotated through an angle corresponding to the angular spacing of the pins 21, 22, whereby the cams 14, 15, 16 are returned to their illustrated starting positions, and the switches 18, 19, 20 are opened.

Engagement of the movable contact 38 of the switch 36 with the fixed contact 42 causes the brush 84 of the commutator 65 to be connected with the D.C. terminal 96. This circuit, however, is interrupted by the insulated segment 82 which engages the brush 84 when the wheel 63 is returned to its original position by the radio signal, as described above.

The device shown in FIG. 1 is also effective if the last element of the radio time signal is not received either because of fading, or because of malfunctioning in the radio transmitter or the radio receiver. As has been described above, the wheel 63 is turned by one tooth spacing whenever current passes through the contact 41 of the switch 35. If a radio signal is not received, the magnet 78 is not energized, and the wheel 63 is not returned to its starting position by the biasing spring of the shaft 64. A continuous circuit is formed between the brushes 84, 85 by the commutator segment 83 and the collector 66 to connect the auxiliary winding 57 of the relay 53 with the D.C. terminal 96 while it is connected with the terminal 97 through the contact 39 of the switch 35. The relay 53 thus keeps its contacts 59, 60 closed, and the holding circuit through the contact 59 keeps the relay 53 energized even if the circuit is opened at the contact 42 of the switch 36. The contact 60 therefore energizes the electromagnet 91 which withdraws the ball 89 from the plate 87 of the pendulum 86. The illustrated attachment thus sets the master clock for its approximately proper speed within 24 seconds after failure to receive a radio control signal.

The number of ratchet teeth on the wheel 63 permits the sequence of events described above to be repeated three times. If four successive radio signals are not received, fading no longer can be a reason for the failure. When the wheel 63 is turned by a fourth tooth spacing, the pin 80 closes the switch 81 of an alarm circuit, not otherwise shown.

Eighty-six seconds after start of an operating cycle or two seconds after the movable contact 38 of the switch 36 has been moved from the contact 38 to the contact 42, the pin 45 on the disc 34 engages the arm 46 of the lever 47 which is still being attracted by the magnet 48. The shaft 7 cannot complete its rotation, and the portions of the cams 31, 32, 33 indicated by arrows 105, 106, 107 engage the cooperating elements of the switches 35, 43, 36.

One minute after transmission of the sixtieth-minute signal of the master clock, the timing switch (not shown) of the clock interrupts the current supply of the winding 49 of the electromagnet 48, whereby the lever 47 is returned to the illustrated position by the spring 50. Its arm 46 is swung from the path of the pin 45 into that of the pin 44, and the switches 35, 43, 36 are returned to the illustrated respective positions by the angular displacement of the associated cams. The synchronous motor which drives the pinion 1 is shut off within the following minute by the non-illustrated timing switch of the master clock and the operating cycle is completed.

Even if the illustrated attachment is employed with a master clock having a margin of error of $1 \times 10^{-4}$, the deviation from correct time indication cannot exceed two seconds if corrections are made every six hours. The apparatus is capable of compensating automatically for positive or negative differences of twenty-four seconds, and therefore can operate successfully even if eleven consecutive radio signals are not received. This, of course, is not likely to occur.

The invention thus provides a relatively simple attachment for existing pendulum-operated master clocks of various types which are not otherwise suitable for remote control, and permits such master clocks to be operated at the required standards of accuracy.

We claim:
1. In a master clock arrangement, in combination:
   (a) a pendulum;
   (b) electrically operated regulating means for varying the effective length of said pendulum including increments of mass, said regulating means being effective by adding said increments of mass to a portion of said pendulum remote from the center of gravity thereof and by withdrawing said increments;
   (c) a source of electric operating power;
   (d) a first signal source;
   (e) a second signal source;
   (f) control means operatively connected to said sources and to said regulating means for connecting said source of operating power to said regulating means for adding one of said increments to said pendulum in response to a first sequence of signals from said signal sources, for withdrawing one of said increments in response to a second sequence of said signals, and for remaining inactive in response to a third sequence of said signals,
      (1) the signal from said first source preceding the signal from said second source in one of said sequences, the signal from said second source preceding the signal from said first source in another one of said sequences, and the signals from said signal sources being substantially simultaneous in yet another one of said sequences.

2. In an arrangement as set forth in claim 1, said control means including main switch means, auxiliary switch means, main actuating means for actuating said main switch means, auxiliary actuating means for actuating said auxiliary switch means, a synchronous motor, first coupling means for drivingly coupling said motor to said auxiliary actuating means for a predetermined period, second coupling means for drivingly coupling said motor to said main actuating means in response to a signal from said first signal source and to the actuation of said auxiliary switch means by said auxiliary actuating means, said main switch means being conductively interposed between the second signal source and said regulating means for operating the same in response to a signal from said second signal source and to the actuation of said main switch means by said main actuating means.

3. In an arrangement as set forth in claim 2, said regulating means including two stationary electromagnets and two receptacle means mounted on said pendulum for movement therewith in respective paths adjacent said electromagnets for withdrawal of respective increments of said mass by said electromagnets from said receptacle means when said electromagnets are energized, and for adding said increments to said receptacle means when the electromagnets are deenergized, said mass being magetic.

4. In an arrangement as set forth in claim 3, said control means further including two relay means respectively operatively interposed between said electromagnets and said main switch means for receiving a signal from said second signal source and for operating the associated electromagnets in response to the received signal.

5. In an arrangement as set forth in claim 1, said control means including means responsive to a signal from one of said signal sources not followed by a signal from the other signal source within a predetermined time for connecting said source of operating power to said regulating means for setting said effective length at a fixed predetermined value.

References Cited by the Examiner

UNITED STATES PATENTS 2,614,383  10/1952  Pfeffer _____ 58—24
2,695,492  11/1954  Larrabee et al. _____ 58—35
3,011,078  11/1961  Reynolds _____ 307—140

RICHARD B. WILKINSON, *Primary Examiner.*

GERALD F. BAKER, STEPHEN J. TOMSKY,
*Examiners.*